May 20, 1958 G. R. MARKOW 2,835,884
TELEMETERING SYSTEM
Filed Dec. 1, 1954 4 Sheets-Sheet 1

INVENTOR.
GEORGE R. MARKOW
BY
*Raymond W. Junkins*
ATTORNEY

May 20, 1958 G. R. MARKOW 2,835,884
TELEMETERING SYSTEM
Filed Dec. 1, 1954 4 Sheets-Sheet 4
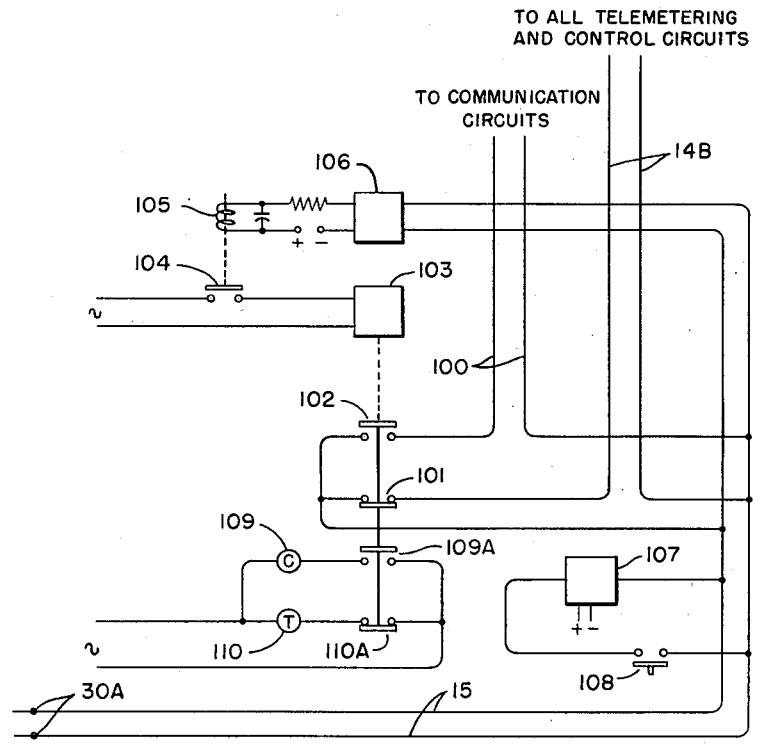
FIG. 4
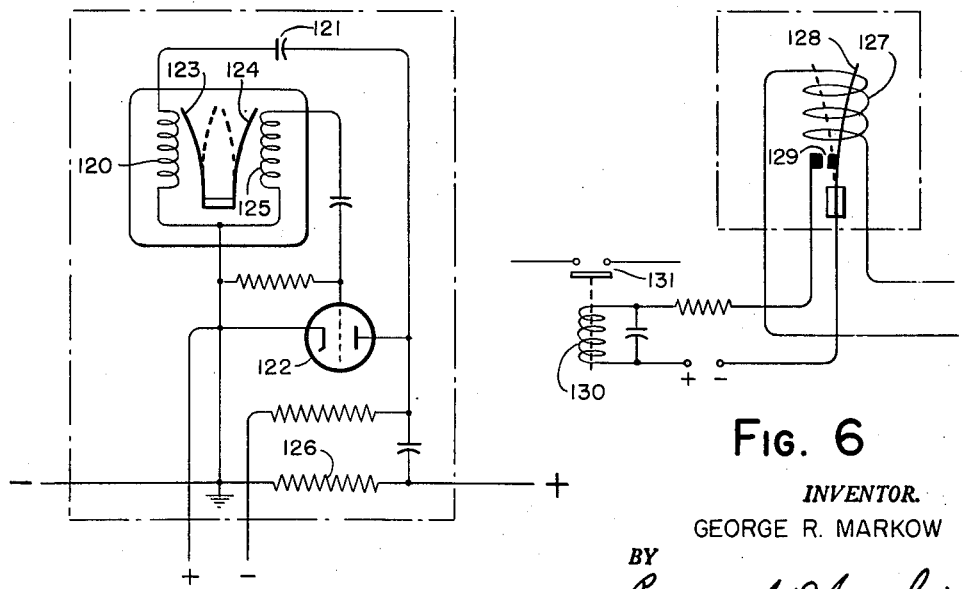
FIG. 5
FIG. 6
INVENTOR.
GEORGE R. MARKOW
BY
Raymond W. Jinkins
ATTORNEY

United States Patent Office 2,835,884
Patented May 20, 1958

2,835,884
TELEMETERING SYSTEM

George R. Markow, Cleveland Heights, Ohio, assignor to Bailey Meter Company, a corporation of Delaware Application December 1, 1954, Serial No. 472,315

10 Claims. (Cl. 340—183)

This invention relates to the long distance transmission of intelligence, particularly to the transmission of the instantaneous value of variable conditions, positions or the like. The variables transmitted may be pressure, temperature, rate of flow, electrical values, the position of objects, etc. Through this mode of transportation, intelligence may be collected at a central control center concerning conditions existing at one or more remotely located stations where conditions may be changing. At the control center, an operator may utilize the intelligence for control of the variables.

A specific embodiment of the invention is disclosed. This embodiment assumes the availability of instrumentalities for detecting the variables and converting them into D. C. voltages whose magnitudes represent the magnitudes of the variables. The D. C. voltages are sequentially transmitted along a common pair of telephone lines. At the same time, A. C. voltages of predetermined frequencies are transmitted along the same telephone lines for actuation of structural components of the embodiment.

The specific embodiment of the invention has been disclosed as applied to a fluid transportation system having a number of pumping stations located along a pipe line for the fluid and at a considerable distance from the control center. The pumping stations may be unattended, as the information with respect to the variables is automatically gathered at the control center, and control over the speed of the pump may be exerted from the control center. Specifically, pump suction pressure, pump discharge pressure and pump speed are made known to an operator at the control center by means of the invention. Although these specifically named variables are basically collected from any one pump station in a controlled sequence, and from the various pump stations in a controlled sequence, the invention also provides for individual variables to be brought to the control center, from any point, separate from the basic sequence.

The inventive concepts of the present invention were formed in meeting the problems of a particular commercial installation. The limitation to one pair of telephone lines for transmission of the intelligence was an initial, fundamental limitation. Another requirement was that the intelligence transmitted to the control station was to be recorded continuously by separate recording pens. The control exerted over the speed of the pumps at the various stations was to be provided over the common telephone lines. It was also required that the same telephone lines be used for communication, the telemetering and control functions being suspended during the communication period.

Devices available for sensing the pressures and speed at each pumping station have various well-known commercial forms. Where it was more convenient to produce an A. C. voltage representative of the measured variable, it was elemental to provide rectification in order that all pumping station variables would be in terms of D. C. voltages. Also, for the independently measured variable, which actually was the percentage of concentration of solids in the transported fluid, measured at the terminus of the fluid, the A. C. voltage output of the measuring instrument was rectified.

The invention was conceived around the function of stepping switches at the transmitter and receiver locations. These switches, having a multiplicity of positions, are caused to connect companion receivers and transmitters in going through their cycles. It was only necessary to insure that the switches were coordinated in their cycles to obtain the basic function of the structure. The more obvious of the subsequent arrangements were the provisions for the interruption and release of the recording mechanisms of the various receivers scanned by the basic function of the switches.

Actuating circuits for the switches were provided, with relays tuned to respond to specific frequencies of the A. C. voltage. In general, the actuating circuit of the control center switch was given regular energization establishing the speed with which the scanning cycle was traversed. An oscillator, producing an A. C. voltage of fixed frequency, was connected into the transmission circuit of the system and the various actuating circuits of the station switches energized with the control center switch.

A circuit for maintaining the actuation of the switches in synchronization was developed so that a check on synchronization between all switches would be accomplished every cycle of operation. This circuit employed additional oscillators and selectively responsive relays. It was found that the scheme was practical, although only a common pair of telephone lines were used, as there was no interaction between the relays tuned to be actuated by oscillators of stable and predetermined frequencies.

Control circuits for the motors were also developed by use of additional oscillators and relays. Common telephone lines remain practical for this service. The control function does not interfere with the recording function with the control function being provided by selected frequencies of A. C. voltage.

In addition to the foregoing, a circuit was developed for bringing a variable back from the pipe line, to the control station, by means of still another oscillator and responsive relay. It had become apparent that, with D. C. telemetering, a large number of oscillators and relays may be used on a single line for various control functions in the system.

Finally, a circuit was developed for interrupting all of the telemetering operations while communication took place on the telephone lines. Again, with selected oscillators and responsive relays available, it was found practical to terminate the telemetering function from any station and communicate with all other stations and the control center.

It can now be appreciated that a principal object of the invention is to provide a method and means for remotely, and periodically, ascertaining the value of a variable condition.

Another object of the invention is to provide for bringing a plurality of variables from various stations to a central location for utilization by an operator.

Another object of the invention is to provide a basic sequence for scanning variables at each of a number of stations, and the variables of a number of stations, with a periodic check on the synchronization of the scanning sequence.

Another object of the invention is to provide for directional control of variables at a selected one of several stations from a single control center.

A still further object of the invention is to provide for telemetering and control, simultaneously, over a single medium of transmission and for communication during periods of telemetering and control interruption.

Referring to the drawings:

Fig. 4 is a circuit diagram of a system for alternating between telemetering-control connections of the system and communication connections in the system.

Fig. 5 is a circuit diagram of an oscillator circuit used in the system of Figs. 1, 2 and 3.

Fig. 6 is a circuit diagram of a relay responsive to a selected oscillator circuit similar to that of Fig. 5.

Figure 1:
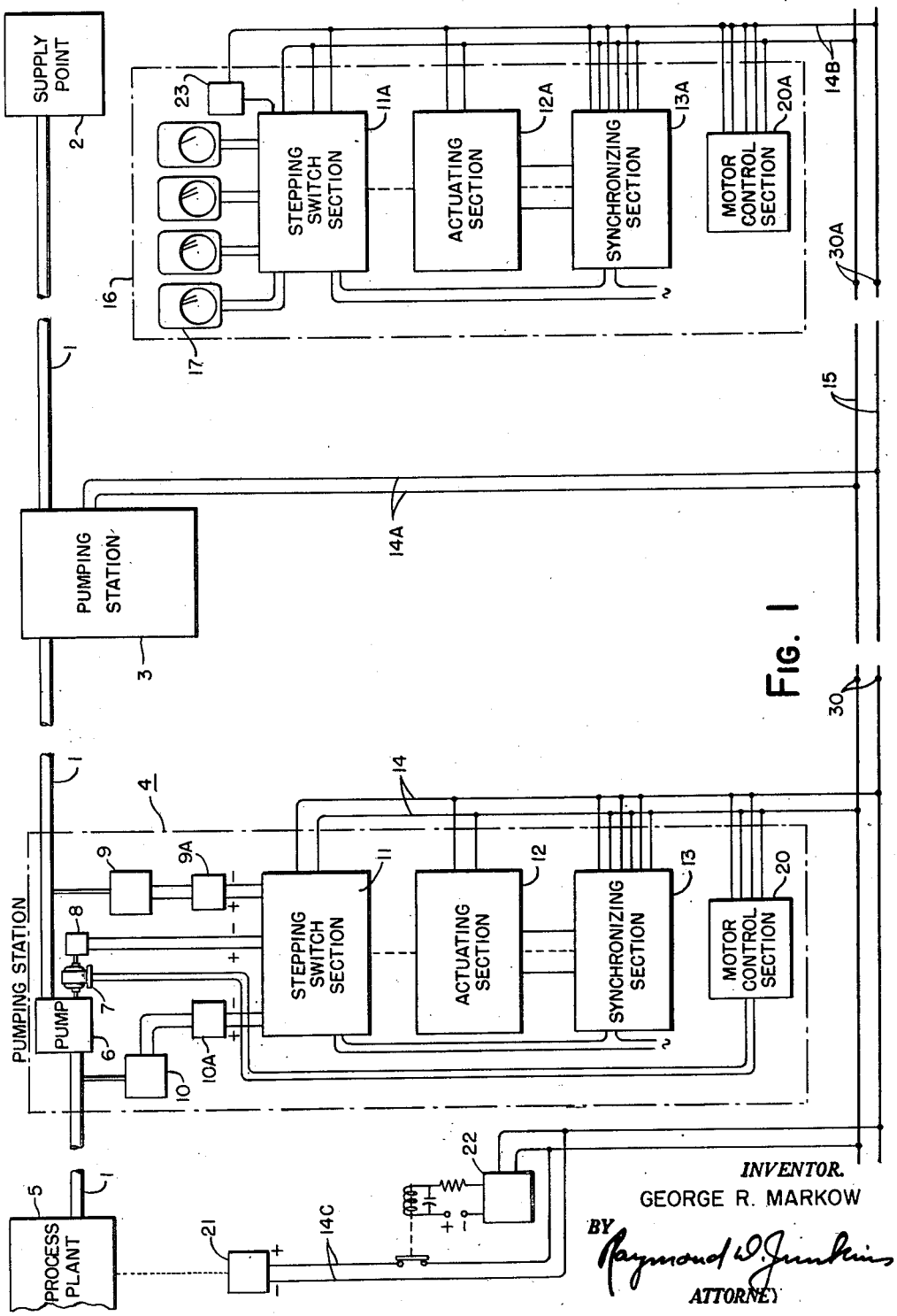
Fig. 1 is a block diagram of a fluid pipe line to which the invention has been applied.

Fig. 1 discloses a pipe line 1 taking fluid from a supply point 2 for eventual delivery to a terminus. A series of pumping stations are provided at intervals along this pipe line to keep the fluid material flowing through it at a satisfactory rate. Although the invention could be applied to a larger number of pumping stations, only stations 3 and 4 are used to represent the plurality of pumping installations.

Attention is directed to the fact that pumping stations 3 and 4 are duplicates. Both stations are shown in diagrammatic form. Station 3 is merely shown as a single diagrammatic block in the pipe line. At station 4, the separate measuring instrumentalities are depicted as blocks, along with the various circuits and structures in which the invention is embodied. Subsequent drawing figures will disclose the pertinent features of the components of the invention diagrammatically illustrated in Fig. 1. One degree of scope of the invention, however, is depicted to best advantage by this arrangement of Fig. 1.

If the path of pipe line 1 is traced from supply point 2 it will be seen to carry pumping stations 3 and 4 intermediate a terminus point, referred to as processing plant 5. Some of the broader objects of the invention can be immediately appreciated when it is observed that the various factors associated with the fluid, and its transport, are detected at the various stations, and terminus, and this intelligence is brought back to the central control station associated with supply point 2. Having been collected, the intelligence is put to use by the operating personnel at the control point in various ways. Solid material may be added to, or subtracted from, the fluid. The speed of various motors of the stations may be increased or decreased. Obviously the action taken upon receipt of the intelligence depends upon the nature of the variable collected.

Attention is next drawn by the fact that components of each station are electrically connected to a transmission trunk line going into a common telemetering line extending to the central control station. Pumping station 4 has been illustrated, to a degree, as to how its various structural components are associated with each other and the common trunk line. The function of the stations centers about their pumps which create a differential between suction and discharge pressure for forcing the fluid along pipe 1. Obviously motor 7 is to drive pump 6 and a tachometer device 8. Tachometer 8 produces a D.-C. voltage representative of pump speed.

Pressure sensitive devices 9 and 10 are not depicted in detail in this Fig. 1. Functionally, these instrumentalities sense the suction and discharge pressures of pump 6 and transduce them into electrical values. In many of these instrumentalities, it is more convenient to transduce the pressure into A.-C. voltage. Rectifier circuits, indicated at 9A and 10A, can be provided to produce D.-C. voltages. The result is that all three variables of the pumping stations are transduced into D.-C. voltages for transport, by the present invention, to the central control station.

Stepping switch 11, actuating section 12 and synchronizing section 13 are all illustrated in block form. The specific coordination of these components will be illustrated in subsequent figures. Attention is drawn, at this time, to the fact that stepping switch 11 is illustrated as mechanically positioned from actuating section 12. The function of synchronizing section 13, on actuating section 12, is exerted through electrical connections as it is controlled from the stepping switch. The result is that as stepping switch 11, essentially a multi-point switch with a single contacting arm, is taken through its cycle by a mechanical connection from actuating section 12, the various D.-C. voltages, brought to the various contacts over which the contactor moves, are "scanned" by the switch.

Trunk lines 14 are common to all the various components of switch 11, actuating section 12 and synchronizing section 13. Main telemetering lines 15 are common with all the trunk lines 14, 14A, etc., of the various measuring stations and the central control stations.

Attention is next directed to central control station 16 where recorders 17, 17A, etc., are located. It may be quite feasible to provide a multiplicity of recording pens in a single meter case. Illustratively two pen recorder cases have been disclosed. For the mechanism actuating each recording pen, a switch is provided to connect the mechanism to trunk line 14B and to alternately lock the mechanism when not connected to the trunk line.

Again a fundamental objective of the invention can be appreciated which is to sequentially connect the recording mechanisms of these devices to their companion transmitters of the various measuring stations along pipe line 1. Stepping switch 11A is taken through its cycle from actuating section 12A in coordination with the other stepping switches on a program monitored by synchronizing sections 13, 13A, etc.

Further, it can be seen that the control segment of the structure is embodied in motor control sections 20 and 20A. Here again, the specific arrangements of the components of these sections are to be subsequentially illustrated. It is sufficient to appreciate, at this point, that control is exerted over motor 7 by section 20, electrically connected to trunk lines 14. Motor control section 20A is located at control station 16 and is connected to trunk lines 14B. The two sections are cooperated with the other structure through common lines 15 when an operator at control station 16 manipulates the setting of control section 20A.

Finally, with respect to Fig. 1, transmitter 21 produces an output representative of an independently measured variable along the pipe line 1, or at the processing point 5, as disclosed here. In the commercial installation, transmitter 21 is intended to be responsive to the percent concentration of solid material suspended in the fluid of pipe line 1. Transmitter 21 produces a D.-C. voltage representative of this variable, and this D.-C. voltage is applied to common line 15 by trunk lines 14C. The completion of circuit between trunk lines 14C and lines 15 is made through relay device 22. Relay 22 controls a switch in trunk lines 14C and is, itself, actuated by device 23 at the central control station 16. Although the representation is diagrammatic, it can be appreciated that at a selected position of stepping switch 11A, actuating device 23 causes relay 22 to connect transmitter 21 to its central control station recorder.

Figure 2:
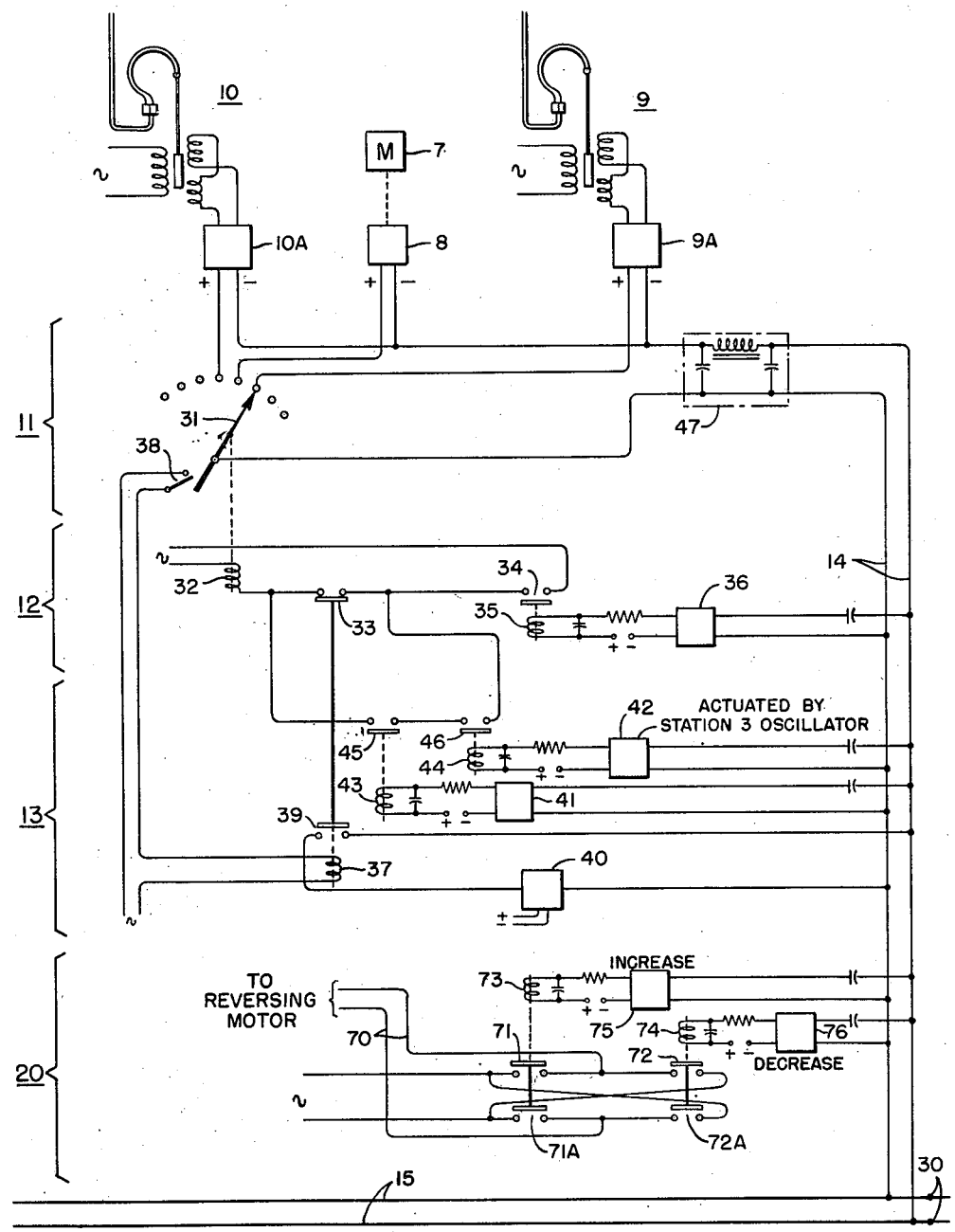
Fig. 2 is a circuit diagram of one pumping station of Fig. 1.
Figure 3:
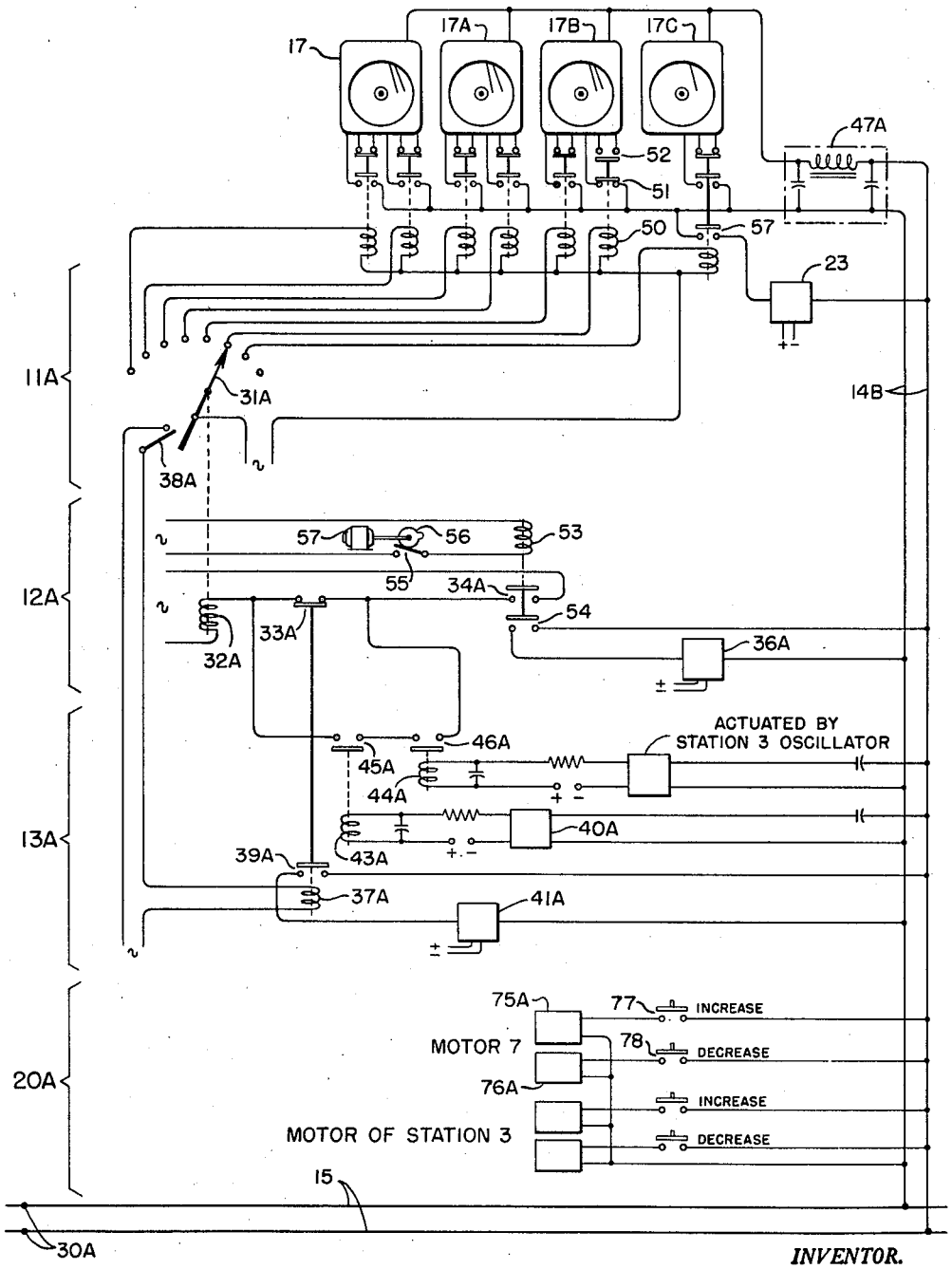
Fig. 3 is a circuit diagram of the control center of the pipe line of Fig. 1.

Reference is now made to Figs. 2 and 3. In Fig. 2 there is disclosed the circuit of that portion of the invention embodied in the pumping stations, as represented by pump station 4. As all of the stations are duplicates of one another, an understanding of the cooperation between station 4 and the central control station 16 will be sufficient for appreciation of this portion of the invention.

In Figs. 2 and 3, pipe line 1 and pump 7 have not been shown. A degree of elaboration has been devoted to disclosing the nature of the mechanism responsive to the pump pressures. As representative of the many specific forms of mechanisms available, a Bourdon tube has been illustrated as positioning the core of a movable core transformer. As the primary coil of this transformer is supplied from a standard line voltage, the output of these transmitters 9 and 10 is an A.-C. voltage, rectified by circuits designated at 9A and 10A.

The pertinent structure of the embodiment actually begins with the connections between devices producing D.-C. voltages representative of the variable detected. Rectifiers 9A and 10A, along with D.-C. producing tachometer 8, are illustrated diagrammatically as in Fig. 1, but their circuits as connected to stepping switch 11 are disclosed in specific detail.

Orientation is now made with respect to the A.-C. line voltages necessary for the operation of the transmitters, solenoid switches and motor circuit. It was not deemed important that a single source for these A.-C. voltages be shown but their points of application may be observed as brought in from the left side of the illustration of the structure for application to the various components.

On the right hand side of the Fig. 2 illustration may be observed trunk lines 14 related to sections 11, 12, 13 and 20 as in Fig. 1. The main telemetering telephone pair 15 is arranged across the bottom of the illustration, connected to trunk lines 14. The coordination between the structure of Fig. 2 and Fig. 3 is made clear by specifically designating terminals 30 in lines 15 to coincide with terminals 30A of lines 15 in Fig. 3.

In more specific review, the basic telemetering objective of the invention is the sequential connection of the output voltages of transmitters 8, 9A and 10A to trunk lines 14. The existence of potentials between each pair of lines from these transmitters is designated by plus and minus signs associated with each lead. The negative lines are joined to a common electrical connection to one of trunk lines 14. Positive side of each transmitter is then assigned to an individual contact of switch 11.

Contactor arm 31 is permanently connected to the positive side of trunk lines 14. As arm 31 is rotated from one contact to the next the transmitters are sequentially connected to the trunk lines.

Specific mechanical arrangements between an arm 31 and its contacts take various forms. For the purposes of the present invention, however, it is only essential, that whatever the type of switch, it is a contactor arm which is moved from one contact position to the next from a mechanical connection with a solenoid, and which, additionally, closes an independent switch in one of its positions. It was not deemed necessary, here, to show more than a diagrammatic representation of contactor arm 31 and a mechanical connection from the core of solenoid 32 to illustrate this element.

Moving to solenoid 32 in actuating section 12, it is observed that this solenoid has a simple circuit permanently energized from line voltage and having the possibility of being completed by one or the other of two pairs of switches. One pair of these switches is considered directly in actuating section 12. Switch 33 of the pair is maintained in a closed position in all but one of the positions of stepping switch arm 31. Switch 34 of the pair is closed every time it is required to change the position of arm 31. The basic operation of actuating circuit 12 is this regular closure of switch 34 to advance switch arm 31 to each new position. Switch 34 is mechanically actuated from solenoid 35 which is periodically energized from relay 36, connected to trunk lines 14.

Synchronizing section 13, just below actuating section 12, has its fundamental functions based upon the actuation of solenoid 37. Note that the circuit of solenoid 37 is permanently energized from the line voltage but must be completed through switch 38, located in stepping switch section 11. At a predetermined position of switch arm 32, switch 38 is closed and solenoid 37 opens switch 33 in the actuating section and simultaneously closes switch 39 in the synchronizing section.

Switch 39 completes the circuit between trunk lines 14 and oscillator 40. The output of this oscillator, imposed on trunk lines 14 is sent out to all other pump station circuits and central control station 16. Resonant relays responsive only to the frequency of oscillator 40 are actuated in the synchronizing circuits of the other pump stations and central control station 16. The consummating result of this function throughout the system can now be appreciated.

At corresponding positions of the switch arm in the circuits of the other pump stations, and central control station 16, oscillators similar to 40 send selected frequencies to the relays 41 and 42 whose solenoids 43 and 44 control switches 45 and 46. Note that switches 45 and 46 are in the by-pass circuit around switch 33 of stepping circuit 12. Both switch 45 and 46 must be closed to complete the by-pass of switch 33. It can now be appreciated that if oscillators at the other pump stations and central control point 16 send out their A.-C. frequencies which actuate the relays represented by 41 and 42, the by-pass of switch 33 will be complete. Obviously, if similar positions for all stepping switches are selected for actuation of their switches corresponding to 38 there would have to be a simultaneous closing of these switches to complete the by-passing of switch 33 in actuating section 12 and permit the continued cycling of switch arm 31 from solenoid 32 as energized from the actuating circuit.

The foregoing function of oscillators and responsive relays through common lines 15 is assumed possible as long as there is no interaction between relays and no interference with the D.-C. voltages being taken from the transmitters back to their companion receivers at the central control point 16. To insure that none of the frequencies transmitted by the oscillators of the system will be imposed upon the D.-C. transmitters, a low pass filter 47 is arranged between the transmitters and trunk lines 14. To keep the D.-C. signals isolated from the relays, capacitors are placed in their connections to the trunk lines.

At this point more specific reference should be made to Fig. 3. Stepping switch section 11A is characterized by switch arm 31A which makes a cycle of contacts identical in number with those at the various pumping stations. Stepping switch section 11A is, as a matter of fact, identical with that of Fig. 2, even to switch 38A, actuated by arm 31A at the position corresponding to that in which arm 31 actuates switch 38 of Fig. 2.

Note that the entire disclosure of Fig. 3 represents the structure of central control station 16. This structure is the terminus for main telemetering lines 15 which bring the outputs of the various transmitters along the system back to actuate recorders 17, 17A, etc.

However, the function of the circuits completed through switch 11A are specifically different from those at the various pumping stations. Note that a circuit is formed, with the line voltage source, contact switch arm 31A and each of solenoids 50, 50A, etc.

Observe the position illustrated for switch arm 31A. The source energizes the circuit of solenoid 50. Switch 51 and switch 52 are actuated by solenoid 50. Switch 51 is closed and switch 52 is opened by solenoid 50. The closing of switch 51 connects the mechanism actuating one of the pens of recorder 17C to trunk lines 14B, and this pen of recorder 17C is thereby caused to respond to the output of transmitter 9 which is simultaneously connected to trunk lines 14 by the position of switch arm 31. Switch 52 is simultaneously opened in order that the mechanism of recorder 17C will position in accordance with the value of the D.-C. voltage output of transmitter 9. In the shown position of solenoid 50, switch 51 is opened and switch 52 is closed in order that the magnitude of the last D.-C. voltage measured will continue to be recorded by that particular pen of recorder 17. As switch arm 31A is moved to each subsequent position in its cycle, the various values of the transmitters, simultaneously brought to the central control position, are recorded by their respective pens in the recorders.

Attention may now be directed to actuating section 12A which, as with section 12 of Fig. 2, is characterized by solenoid 32A which is mechanically connected to switch arm 31A. The circuit for solenoid 32A is identical with that for solenoid 32. Switch 33A and switch 34A perform functions parallel with their companions in Fig. 2. The distinction between the two sections starts in the mechanism for actuating switch 34A. Solenoid 53 is mechanically connected to switch 34A and switch 54. Both switches are closed simultaneously. Closing of switch 54 connects oscillator 36A to trunk lines 14B. The frequency of the voltage output of oscillator 36A is fixed at a value to which only relay 36 is responsive. Therefore, every time the circuit of solenoid 32A is energized by closing contact 34A, oscillator 36A causes relay 36 to actuate the circuit of solenoid 32. The result is that stepping switch solenoids 32 and 32A are actuated through their cycles by forces applied at the same time. The intervals at which actuating section 12A is energized is set by the intervals at which solenoid 53 is actuated. This solenoid 53 has a circuit of its own, energized from line supply, and completed through switch 55, mechanically actuated from cam 56. Cam 56 is rotated by motor 57, and the speed of this motor is of course, predeterminable, establishing the intervals of solenoid 53, and therefore solenoid 32A, actuation.

The remaining functions of the structure of synchronizing section 13A, in its cooperation with section 13 of Fig. 2, should be evident from the foregoing description of section 13. The two sections are identical in the arrangement of switches with respect to actuating sections 12 and 12A. Switches 45A and 46A are arranged to by-pass switch 33A when both are closed. Solenoid 37A is arranged to open switch 33A when its circuit is energized by the closure of switch 38A. And solenoid 37A closes switch 39A when it opens switch 33A. However, closure of switch 39A in synchronizing section 13A connects oscillator 41A to trunk line 14B, and oscillator 41A has a predetermined frequency which actuates relay 41 in section 13.

What must now be appreciated is that all switches in the by-pass circuit of switches 33 and 33A are actuated by relays responsive to individual oscillators of the other stations, as represented by oscillator 40 at pump station 4 and oscillator 41A at central control station 16. The result is that when the actuating arms of the stepping switches 11, 11A, etc. reach the positions at which the switches represented by 38 and 38A are actuated, the actuating circuits are all primarily broken by the contacts represented by 33 and 33A and secondarily completed through by-pass switches represented by 45, 46, 45A and 46A. This function of the synchronizing circuits gives assurance that, once every cycle of the actuating arms of the stepping switches, the actuating arms will start their cycles at the same time. If, for any reason, one switch lags the others in making its cycle, the interlocking relays of the by-pass circuits will cause all switches to wait at their switches 38, 38A, etc. until the lagging switch reaches its similar position.

The scanning sequence in the telemetering function includes the possibility of measuring one or more independent variables once every cycle of the stepping switch at central control position 16. It is of course appreciated that the number of contacts on stepping switch 11A determines the total number of variables scanned. Each contact on switch 11A connects the mechanism of a recording pen to trunk lines 14B. It is assumed in this specific illustration, that three variables at two different points along the pipe line are telemetered to the recorders at the central control station. An eight-point switch 11A is provided in which six of the contact points are connected to six recording mechanisms for basically scanning the six variables of both pump stations. Three consecutive contact points are touched for taking the three variables of one pump station back to their recorders and then three consecutive contact points are touched for taking the next pump station variables back to their recorders. This is the basic cycling sequence of the telemetering system. A seventh contact made by the actuating arm 31A can be used to complete the circuit of an independent oscillator whose impulse on trunk lines 14B will actuate a relay tuned to resonate at the frequency of that oscillator output. The relay may be placed at any location along the pipe line. Such a relay is represented at 22 in Fig. 1 for completing a circuit between an independent transmitter 21 and trunk lines 14C. This means that a variable, out of the basic sequence, but selected once every cycle of stepping switch 11A, will be measured by a recording pen at central control position 16. Specifically, oscillator 23 is shown in circuit with trunk lines 14B through contact 58 so as to actuate relay 22 at a predetermined position of actuator arm 31A that the output of transmitter 21 will be brought to recorder 17C.

In both Figs. 2 and 3, attention can be simultaneously directed to the functions of motor control sections 20 and 20A. Referring specifically to motor control section 20, of Fig. 2, it is to be additionally appreciated that it would have unnecessarily encumbered the drawing to actually show motor leads 70 to motor 7. As a practical matter, leads 70 go to a separate reversing motor which positions a rheostat establishing the speed of main motor 7. All that is required is to provide contacts so that the reversing rheostat motor can be operated in a clockwise or counterclockwise direction. When switches 71 and 71A are opened while switches 72 and 72A are closed, motor leads 70 are connected to the voltage supply source so as to rotate the reversing motor in one direction. Opening switches 72 and 72A and closing switches 71 and 71A will connect the leads 70 to the same supply line source in the opposite direction so as to rotate the motor in the other direction. Solenoid 73 is provided to operate switches 71 and 71A and solenoid 74 is provided for switches 72 and 72A.

Relays 75 and 76 are permanently connected to trunk lines 14 and when actuated from lines 14B, these relays energize the circuits of solenoids 73 and 74. Either oscillator 75A or 76A is connected to trunk lines 14B through pushbuttons 77 and 78. Therefore, when it is desired to increase the speed of motor 7 pushbutton 77 is pressed to connect oscillator 75A into the system. The predetermined frequency of the output of oscillator 75A causes relay 75 to energize solenoid 73 and close contacts 71 and 71A. If it is desired to decrease the speed of motor 7, pushbutton 78 is pressed.

Turning now to Fig. 4, there is shown a system for interrupting all of the telemetering and control functions in order to clear main lines 15 for voice communication throughout the system. The system of Fig. 4, duplicated at each pumping station and control point, permits interruption to take place at any station and, the control point, and continue for as long as voice communication is desired.

In illustration, it was decided that diagrammatic reference to the Fig. 4 circuit in Figs. 1, 2 and 3 would unnecessarily encumber those drawings. Orientation with the preceding structure illustrated is very simple. As an example, the Fig. 4 system has been illustrated as if located at the control point 16. Trunk lines 14B and main lines 15 locate the interrupting system between the motor control section 20A and lines 15.

The basic function of this system of Fig. 4 is to connect either trunk lines 14B, or communication lines 100, to main lines 15. To accomplish this function, either switch 101 or switch 102 is closed. Specifically, the system is illustrated with switch 101 closed in order that the normal telemetering and control functions may take place in the system. Switch 101 completes circuit between trunk lines 14B and main lines 15, and the systems of Figs. 1, 2 and 3 function as previously described.

Lines 100 are indicated as coming from a communication circuit. The structure of Fig. 4 is not concerned with the character of the communication circuit, but functions only to take its output lines 100 into circuit with main telemetering lines 15 during the period when the circuit with trunk lines 14B is interrupted.

Next note that switches 101 and 102 are mechanically interconnected so that when one is closed the other is open. These switches are moved between their alternate positions by mechanical connection with a relay device diagrammatically shown at 103. Relay 103 is in circuit with a line supply and switch 104. Thus, when switch 104 is closed relay 103 is stepped and switches 101 and 102 are open and made, alternately from their position shown in Fig. 4. Switch 104 may then be broken and closed to secure the alternate position of switches 101 and 102.

Switch 104 is actuated from solenoid 105 whose circuit is energized by relay 106. Relay 106 is sensitive to a specific A.-C. voltage frequency, exactly as the selective relays illustrated in the previous figures. It can, therefore, be seen that if a selected frequency of A.-C. voltage is applied to relay 106, trunk lines 14B will be disconnected from telemetering lines 15 and communication lines 100 will be connected to telemetering lines 15.

In order to impose the selected frequency on relay 106 to actuate it and cause the desired interruption, oscillator 107 is provided with its output in circuit with main telemetering lines 15. Note that both relays 106 and oscillator 107 are permanently connected to main lines 15, regardless of the alternation between trunk lines 14B and communication lines 100. This arrangement is common at each of the stations and main control point in order that relays, similar to 106, at each station and control point, perform the same function of interruption simultaneously.

Pushbutton 108 is provided to complete the circuit between oscillator 107 and the system. When an operator at the location of this system momentarily closes pushbutton 108, the interruption takes place by reason of oscillator 107 causing relay 106 to step the relay 103 and move switches 101 and 102 to disconnect the telemetering and control circuits and connect the communication circuits to lines 15.

The system of Fig. 4 is given an indication circuit to denote when the interruption takes place. An annunciator at each station and control point serves to remind operating personnel that interruption has taken place. The dialing system of the communication system will permit selection of the station for communication. Lights 109 and 110 are indicated as energized, in parallel, from a line supply. Their circuits are individually completed through switches 109A and 110A. These switches are alternate, that is, when one is opened the other is closed, by virtue of a common mechanical connection. Additionally, these switches are mechanically connected to switches 101 and 102. Thus the arrangement is convenient that when switch 101 is closed, as illustrated in Fig. 4, switch 110A is closed and light 110 is energized to denote that normal telemetering and control functions are taking place in the system. Of course, interruption causes the closure of switch 109A and the opening of switch 110A with consequent indication, by light 109, of an interruption of telemetering and control functions with consequent replacement by voice communication throughout the system.

Turning now to Fig. 5 and Fig. 6, there is shown the selective frequency transmitting oscillator and selective frequency responsive relay devices indicated diagrammatically throughout the preceding disclosure. The specific form of device shown here for establishing a selected frequency of A.-C. voltage for use in this system is, of course, not the only available device for this purpose. The same holds true for the relay. It is not deemed necessary to specifically illustrate possible electronic circuits which could establish the selected frequencies and the other forms of relays with selected filters for receiving only those frequencies. The forms illustrated in Figs. 5 and 6 appear to be sufficiently representative of the required devices and circuits needed to produce the impulses, and to receive the impulses, which cause the system to operate as previously described.

Referring specifically to Fig. 5, a reed oscillator control is illustrated in the feed back circuit of an electronic triode in an arrangement which will produce a voltage of selected frequency. The circuit between the tube and reed oscillator control is supplied a D.-C. voltage as indicated here and on the diagrammatic blocks of the preceding figures. It may now be appreciated that the D.-C. voltage is applied to the plate-cathode circuit of the electronic tube. Thus it may be followed that drive coil 120 has an initial voltage input applied through it from the charging of capacitor 121 in the plate circuit of tube 122.

The voltage in drive coil 120, of course, establishes an electro-magnetic force which is applied to reed 123. Reed 123 vibrates at a frequency established by many parameters of the mechanical arrangement. These parameters include at least the size of the reed, the length of the reed and the type of mounting for the reed on its base. Whatever the factor, or combinations of factors, establishing the frequency of vibration of reed 123, reed 124 is made to vibrate by reason of common connection therewith.

An electro-magnetic linkage between reed 124 and pick-up coil 125 establishes an induced A.-C. voltage in coil 125. This induced voltage in coil 125 is applied to the grid of tube 122 through its bias capacitor and resistor shown. The fluctuating voltage on the grid of tube 122 causes a change in plate current which circles around to drive coil 120 to sustain the oscillation. The oscillating voltage across tube 122 then becomes the output of the circuit as it appears across resistor 126. It is this selected frequency, basically established by reeds 123 and 124, to which a selected relay will respond. In the final analysis, the oscillator is a source of A.-C. voltage with predetermined frequency, and a large number of these devices can have their predetermined output frequencies spaced from each other over a wide range.

Referring specifically to Fig. 6, the relay device responsive to the output of the oscillator circuit of Fig. 5 is illustrated. Here a coil 127 receives the output voltage of the oscillator circuit and vibrates a reed 128. A switch 129 is made and broken by the vibration of reed 128. Of course, the reed is constructed to vibrate at a selected frequency of A.-C. voltage applied to coil 127.

The making and breaking of contact 129 completes the circuit between solenoid coil 130 and the D.-C. voltage source indicated. The capacitor shown is charged sufficiently to energize coil 130 and actuate switch 131. It is to be understood that solenoid coil 130 and switch 131 are here representing the various specific coils and switches illustrated throughout the prior disclosure, as controlled by selective relays. In final analysis, we have, in the relay of Fig. 6, a receiver for the voltage of predetermined frequency of the oscillator of Fig. 5 which is selective to that specific frequency transmitted by the oscillator of Fig. 5. With a number of these relays selectively responsive to specific oscillators, the principles of the invention illustrated by the foregoing specific embodiment may be accomplished.

What I claim as new, and desire to secure by Letters Patent of the United States, is:

1. A telemetering system for a plurality of variables represented by voltages, including, a first stepping switch for connecting each of the variable voltages in turn to a transmission line, a receiving recorder for each of the variable voltages, a second stepping switch for connecting each recorder in turn to the transmission lines, an actuating circuit for each stepping switch, means for regularly energizing the actuating circuit of the second stepping switch, a first source of voltage with a fixed predetermined frequency, means for connecting the first voltage source to the transmission line as the actuating circuit of the second stepping switch is energized, a relay-controlled completion switch for the circuit of the second stepping switch, and a relay for the completion switch selectively responsive to the first source of voltage.

2. The system of claim 1 including, a switch normally completing each actuating circuit and broken by its stepping switch energizing a synchronizing circuit at a position common to all the stepping switches, each of a series of sources of voltages of predetermined frequencies applied by each of the synchronizing circuits to the transmission line as each synchronizing circuit is energized, a series of switches paralleling the broken switches in each actuating circuit, and relays selectively responsive to the sources of voltages applied to the transmission line by the synchronizing circuits to close the series of parallel switches in completing the by-pass of the broken switches of the actuating circuit.

3. The system of claim 2 including, a source of pulsating voltage of predetermined frequency applied to the transmission line through a contact on the second stepping switch, a transmitter responsive to a variable and producing a voltage representative thereof, and a relay in the transmission line at the transmitter for connecting the transmitter output to the transmission line in response to the pulsating voltage applied to the transmission line through the contact on the second stepping switch.

4. The system of claim 3 including, a motive means for modifying one of the variables represented by voltages, a circuit for the directional control of the motive means, switches for the directional connection of the circuit to the motive means, relays in the transmission line actuating the directional connection switches in response to voltages of predetermined frequencies, transmitters of predetermined frequencies for actuating the directional relays, and manually controlled means for selectively connecting the transmitters to the transmission line.

5. The system of claim 4 including, a voice communication system, a system for alternately switching between the voice communication system and the telemetering and motive control system on the transmission line, a relay for positioning the switch system between the alternate positions in response to voltages of predetermined frequency, and a transmitter of voltage of predetermined frequency, which will actuate the switch system relay, and manually controlled means for connecting the transmitter to the transmission line.

6. A time-multiplex telemetering system, including a first multiple switch cycled to connect a series of variable exhibiting mechanisms to a transmission line, a second multiple switch cycled to connect a series of variable voltages to the transmission line, actuating power means for each multiple switch moving the switches through their cycles, means for regularly energizing the circuit of the actuating power means for the first multiple switch, a first transmitter of a fixed predetermined frequency of voltage, means for connecting the transmitter to the transmission line simultaneously with the energizing of the actuating power means circuit of the first multiple switch, and a relay selectively responsive to the first transmitter for energizing the circuit of the actuating power means of the second multiple switch.

7. The telemetering system of claim 6 including, actuating power means for each multiple switch energized by the contact arms of the switches at a position common with all the arms, a second transmitter of a predetermined frequency of voltage connected to the transmission line by the actuating power means energized by the first multiple switch, a third transmitter of a predetermined frequency of voltage connected to the transmission line by the actuating power means energized by the second multiple switch, a first switch broken by the power means energized by the first multiple switch and arranged in the circuit of the actuating power means cycling the first multiple switch, a second switch broken by the power means energized by the actuating means energized by the second multiple switch and arranged in the circuit of the actuating power means cycling the second multiple switch, a by-pass circuit for the first switch completed through a switch closed by the third transmitter, and a by-pass circuit for the second switch completed through a switch closed by the second transmitter.

8. The system of claim 7 wherein, motive means which controls one of the variable voltage, a relay responsive to a predetermined frequency of voltage of the transmission line establishing the power of the motive means, and a third transmitter of the predetermined frequency for the motive relay is manually applied to the transmission line.

9. The system of claim 8 wherein, one position of the first multiple switch connects a fourth transmitter to the transmission line, and a relay responsive to the fourth transmitter output connects a transmitter of an independent variable to the transmission line.

10. A system of claim 9 wherein, a fifth transmitter is manually applied to the line to disconnect all telemetering and control functions and connect a system for voice communication to the transmission line.

References Cited in the file of this patent

UNITED STATES PATENTS 2,466,804  Giffen et al. _____ Apr. 12, 1949